3,185,572
COMPOSITION FOR USE AS ADDITIVE TO ANIMAL DRINKING WATER AND FEED
Werner Josef Motzel, Gaualgesheim (Rhine), Germany
No Drawing. Filed Jan. 11, 1962, Ser. No. 165,672
Claims priority, application Germany, Jan. 13, 1961, M 47,681
3 Claims. (Cl. 99—2)

The present invention relates to new compositions useful as additives to drinking water and feed for herbivorous animals, especially ruminants, such as bovine cattle, sheep, and goats that regurgitate and chew a second time cellulose-containing feeds that had previously been ingested and predigested with the aid of bacteria in a rumen or first stomach.

Tests have already been made with feed mixtures composed of about 80% of molasses, 6% of ethyl alcohol, 4% of phosphoric acid of 75% strength and 10% of urea and containing small amounts of trace elements. These mixtures have been fed separately to the animals at their normal feeding places, e.g., while the animals were grazing on pasture. In many animals such feed mixtures produced a particularly high weight increase. However, they proved to objectionable because the animals fed feeds containing such mixtures too frequently overeat.

According to the present invention the new compositions contain the following components:

About 30 to 70% of urea,
About 15 to 25% of phosphoric acid of 75% strength, and
About 15 to 40% of glycerine, and, if desired, mineral salts, trace elements, vitamins and similar known additions.

The following composition has been found to be especially suited and advantageous:

50% of urea,
20% of phosphoric acid of 75% strength, and
30% of glycerine, to which composition may be added, if desired, small amounts of the usual salt and vitamin additives, all values referred to by the percent sign (%) are to be understood to refer to percent by weight.

The new compositions are not administered or supplied as such to the animals, but are supplied in the form of additives to the drinking water or the feed for the animal, in order to stimulate and intensify the action of the bacteria present in the stomach of the animals, particularly bacteria in the first stomachs or rumens of ruminants.

It is particularly advantageous to add the new compositions to the drinking water of the animals and to use amounts equivalent to 25 grams of the composition for each drink per animal. If desired, the new compositions may also be added to animal feeds, such as bran, chaff, turnips and the like.

It has been found that the meat produced from animals which had regularly and continuously ingested feeds or water containing the new compositions is remarkably improved in quality and that these animals put on more protein but less fat. The amount of meat produced is likewise increased by using the new compositions, which is indicated by a higher weight increase.

Further it has been found, that the use of the new compositions has the advantage over the use of the additives containing ethyl alcohol, that the animals fed therewith acquire a particularly fine and smooth skin.

I claim:
1. A composition for use as an additive to animal drinking water and feed consisting essentially of

30 to 70 percent by weight of urea
15 to 25 percent by weight of phosphoric acid of 75 percent strength and
15 to 40 percent by weight of glycerine.

2. The composition according to claim 1 containing

50% by weight of urea,
20% by weight of phosphoric acid of 75% strength, and
30% by weight of glycerine.

3. The composition according to claim 1 containing in addition to the three components small amounts of conventional salt and vitamin additives.

References Cited by the Examiner
UNITED STATES PATENTS 2,460,776  2/49  Vincent _____ 167—85
2,801,173  7/57  Devareaux _____ 99—2
2,808,332  10/57 Anderson et al. _____ 99—6

FOREIGN PATENTS 191,724  9/57  Austria.

A. LOUIS MONACELL, *Primary Examiner.*
BEATRICE H. STRIZAK, *Examiner.*